United States Patent
Pan

(10) Patent No.: US 12,308,716 B2
(45) Date of Patent: May 20, 2025

(54) PERMANENT MAGNET BRUSHLESS MOTOR, ROBOT JOINT, SERVO ACTUATOR, AND ROBOT

(71) Applicant: SHANGHAI WUJI TECHNOLOGY CO., LTD., Shanghai (CN)

(72) Inventor: Yunzhe Pan, Shanghai (CN)

(73) Assignee: SHANGHAI WUJI TECHNOLOGY CO., LTD., Shanghai (CN)

( * ) Notice: Subject to any disclaimer, the term of this patent is extended or adjusted under 35 U.S.C. 154(b) by 469 days.

(21) Appl. No.: 17/905,823

(22) PCT Filed: Dec. 2, 2020

(86) PCT No.: PCT/CN2020/133270
§ 371 (c)(1),
(2) Date: Sep. 7, 2022

(87) PCT Pub. No.: WO2021/139455
PCT Pub. Date: Jul. 15, 2021

(65) Prior Publication Data
US 2023/0124308 A1     Apr. 20, 2023

(30) Foreign Application Priority Data

Jan. 7, 2020 (CN) .......................... 202020022641.8
Mar. 4, 2020 (CN) .......................... 202020251532.3
(Continued)

(51) Int. Cl.
*H02K 21/16* (2006.01)
*B25J 9/12* (2006.01)
(Continued)

(52) U.S. Cl.
CPC .............. *H02K 21/16* (2013.01); *B25J 9/126* (2013.01); *B25J 17/00* (2013.01); *H02K 1/146* (2013.01); *H02K 1/2783* (2022.01); *H02K 3/18* (2013.01)

(58) Field of Classification Search
None
See application file for complete search history.

(56) References Cited

U.S. PATENT DOCUMENTS 7,692,354 B2    4/2010  Abou-Akar et al.
7,928,624 B2    4/2011  Huppunen et al.
(Continued)

FOREIGN PATENT DOCUMENTS

CN    101018002 A    8/2007
CN    101569078      10/2009
(Continued)

OTHER PUBLICATIONS

International Search Report in PCT/CN2020/133270 mailed on Mar. 8, 2021, 7 pages.
(Continued)

*Primary Examiner* — Bernard Rojas
(74) *Attorney, Agent, or Firm* — METIS IP LLC

(57) ABSTRACT

A permanent magnet brushless motor, robot joint, a servo actuator, and a robot are provided. The motor is of fractional-slot and inrunner type, including a stator (1) and a rotor (2). The stator (1) includes a stator iron core (10) and a stator winding, the stator winding is a concentrated winding, and the stator iron core (10) has an integral structure. The stator iron core includes a stator yoke and stator teeth, the stator teeth include a plurality of stator teeth (102) protruding from the stator yoke, and the surfaces of the stator teeth (102) are provided with insulating layers. The stator winding comprises a plurality of preset winding coils
(Continued)

(11) formed by machine, and each stator tooth is inserted into x winding coils, wherein x is greater than or equal to 1. The rotor (2) comprises a permanent magnet (21) and a permanent magnet carrier (22). The embodiments of the present disclosure can improve a slot fill factor, and optimize an electromagnetic design while ensuring the smooth operation of the meter, thereby improving a per mass motor constant and output power density of the motor.

20 Claims, 17 Drawing Sheets

(30) Foreign Application Priority Data

Apr. 24, 2020 (CN) .......................... 202010330604.8
Apr. 24, 2020 (CN) .......................... 202020633073.5

(51) Int. Cl.
*B25J 17/00* (2006.01)
*H02K 1/14* (2006.01)
*H02K 1/2783* (2022.01)
*H02K 3/18* (2006.01)

(56) References Cited

U.S. PATENT DOCUMENTS

| | | |
|---|---|---|
| 2002/0171305 A1 | 11/2002 | Coupart et al. |
| 2007/0075604 A1* | 4/2007 | Hsu ...................... H02K 15/066 |
| | | 310/216.023 |
| 2008/0224475 A1 | 9/2008 | Mellor et al. |
| 2009/0251024 A1* | 10/2009 | Huppunen ............... H02K 3/28 |
| | | 310/195 |
| 2017/0237304 A1* | 8/2017 | Okochi .................. H02K 1/146 |
| | | 310/216.069 |
| 2018/0097431 A1 | 4/2018 | Laldin et al. |
| 2018/0166956 A1* | 6/2018 | Seno ..................... H02K 15/045 |
| 2021/0075285 A1* | 3/2021 | Husband .................. H02K 3/28 |

FOREIGN PATENT DOCUMENTS

| | | |
|---|---|---|
| CN | 201910715 U | 7/2011 |
| CN | 103414274 | 11/2013 |
| CN | 103647421 A | 3/2014 |
| CN | 111490611 | 8/2020 |

OTHER PUBLICATIONS

Written Opinion in PCT/CN2020/133270 mailed on Mar. 8, 2021, 8 pages.

* cited by examiner

PERMANENT MAGNET BRUSHLESS MOTOR, ROBOT JOINT, SERVO ACTUATOR, AND ROBOT

CROSS-REFERENCE TO RELATED APPLICATIONS

This application is a U.S. national stage under 35 U.S.C. § 371 of International Application No. PCT/CN2020/133270, filed on Dec. 2, 2020. which claims priority to Chinese Patent Application No. 202020022641.8 filed on Jan. 7. 2020, Chinese Patent Application No. 202020251532.3 filed on Mar. 4, 2020, Chinese Patent Application No. 202010330604.8, filed on Apr. 24, 2020, named "Permanent Magnet Brushless Motor, Robot Joint, Servo Actuator, and Robot," and Chinese Patent Application No. 202020633073.5 filed on Apr. 24, 2020, the contents of which are hereby incorporated by reference to its entirety.

TECHNICAL FIELD

The present disclosure relates to a field of motor, and in particular to a permanent magnet brushless motor and robot joint thereof, a servo actuator, and a robot.

BACKGROUND

In recent years, the field of robotics has developed rapidly, particularly special-purpose robots, such as legged robots. This type of robot has a demanding requirement on an actuator: low speed (below 500 rpm), large torque, lightweight, large output power, small size, and high response speed. The performance of the actuator directly determines the performance of the robot, and the performance of the actuator is directly determined by the motor. The performance of the robot motor can be represented by per mass motor constant, i.e., the motor constant per unit mass, i.e., the output torque divided by the product of square root of copper loss and the weight of motor. For example, for a motor with net weight of about 200 g, motor constant per unit mass is generally less than 1.4 Nm/kg $\sqrt{w}$. The performance of a robot motor is limited by many factors, such as slot fill factor, motor size, and motor design.

The inventor found that the related technique has at least the following problems: the present robot motor generally uses a stator tooth with pole shoes to ensure a low cogging torque and a smooth motor operation. The stator teeth with pole shoes also limits the choice of winding process, so that each present winding coil is generally wound on the stator tooth through a dedicated winding machine in general. The aforementioned dedicated winding machine and winding process seriously limit the slot fill factor of the motor stator. The present robot motors generally adopt design of high-speed and low-torque with a high reduction ratio to reach high actuator torque output, and there is still significant room for improving the performance of the actuator by increasing motor torque capability.

SUMMARY

Given the above background of the field, the present disclosure aims at providing a permanent magnet brushless motor, a robot joint, a servo actuator, and robot, which has a higher slot fill factor and optimized electromagnetic design while ensuring a smooth operation and low cogging torque, thereby improving per mass motor constant and output power density of the motor.

To solve the above technical problems, the embodiments of the present disclosure provide a permanent magnet brushless motor, the permanent magnet brushless motor is of fractional-slot and inrunner type and includes a stator and a rotor. The stator includes a stator iron core and a stator winding, the stator winding is a concentrated winding, and the stator iron core has an integral structure. The stator iron core comprises a stator yoke and stator teeth, the stator teeth include a plurality of stator teeth protruding from the stator yoke, and the surfaces of the stator teeth are provided with insulating layers. The stator winding includes a plurality of preset winding coils formed by machine, and each stator tooth is inserted into x winding coils respectively; wherein x is greater than or equal to 1. The rotor includes permanent magnet and a permanent magnet carrier, wherein the permanent magnet produces rotating excitation field.

According to the embodiments of the present disclosure, a robot joint actuator is further provided, including the above permanent magnet brushless motor.

According to the embodiments of the present disclosure, a servo actuator is further provided, including the above permanent magnet brushless motor.

According to the embodiments of the present disclosure, a robot is further provided, including the above permanent magnet brushless motor.

In the prior art, a winding is directly wound on the stator tooth. Since coil winding could interfere with an adjacent stator tooth and the winding coil on the adjacent stator tooth, gaps between the coils are large, which greatly reduces the slot fill factor. Compared to the prior art, in the embodiments of the present disclosure, present winding or assembly method of winding coil is abandoned, the motor has a concentrated stator winding, and the stator winding coil is formed by machine in a separated process and then having the stator tooth inserted, thereby posing no spatial constraint for the manufacturing process of winding coil. Therefore, design requirement of the winding coil can be more readily met, gap between the adjacent coils is reduced, and air gap area is increased, which are conducive to improving the slot fill factor, thereby improving motor's per mass motor constant and output power density.

In addition, width of each stator tooth from tooth top away from the stator yoke to a tooth root close to the stator yoke is the same.

Otherwise, width of each stator tooth from the tooth top away from the stator yoke to the tooth root close to the stator yoke gradually increases.

In addition, cross-sectional shape of a cavity enclosed by the winding coil is a rounded rectangle, a racetrack, an ellipse, a rectangle, or a parallelogram.

In addition, the protruded part of stator tooth in circumferential direction forms chamfer or fillet at edges.

In addition, width of the narrowest part of each stator tooth is greater than or equal to 30% of an inner circumference of the stator/N, and is less than or equal to 65% of the inner circumference of the stator/N, wherein N is a number of the stator teeth.

Thickness of the stator yoke is greater than or equal to 30% of the narrowest part of the stator tooth, and is less than or equal to 250% of the narrowest part of the stator tooth.

Inner diameter of the stator iron core is greater than or equal to 75% of an outer diameter of the stator iron core and is less than or equal to 90% of the outer diameter of the stator iron core.

In addition, arithmetic mean radial thickness of the permanent magnet is less than or equal to 25 times the arithmetic mean air gap distance and is greater than or equal to 2 times the arithmetic mean air gap distance.

In addition, axial height of the stator iron core is less than or equal to 20% of the outer diameter of the stator.

In addition, an air gap is formed between the stator and the rotor, and the arithmetic mean air gap distance is less than or equal to 0.7% of the outer diameter of the stator.

In addition, the permanent magnet is mounted on a side surface of the permanent magnet carrier. The side surface is on the side closer to the stator.

In addition, the permanent magnet includes a plurality of permanent magnet pieces, each of which is mounted a surface of the permanent magnet carrier, otherwise, the permanent magnet, of an integral annular structure, is mounted on the surface of the permanent magnet carrier.

In addition, the material of the permanent magnet carrier is soft magnetic material or non-soft magnetic material.

In addition, the plurality of permanent magnet pieces forms a Halbach array.

In addition, the motor is a three-phase motor with a slot pole number being an integer multiple of 12/10 or 12/14.

In addition, the circumference of the winding coil on the stator tooth from close to the stator yoke to away from the stator yoke has a decreasing tendency.

In addition, if the x is greater than or equal to 2, the number of winding turns of each x winding coils into which the stator tooth is inserted is the same.

BRIEF DESCRIPTION OF THE DRAWINGS

To more clearly explain the technical scheme of the embodiment of the present disclosure, the accompanying drawings required in the description of the embodiment will be briefly introduced below, understandably, the drawings in the following description are merely embodiments of the present disclosure. For those skilled in the art, the other drawings may be obtained according to drawings provided without paying creative labor.

1—stator, 10—stator iron core, 101—stator yoke, 102—stator tooth, 11—winding coil, 110—cavity, 11a—winding coil close to tooth root, 11b—winding coil close to tooth top, 111—circumference of winding coil, 111a—circumference close to the tooth root of winding coil, 111b—circumference close to the tooth top of winding coil, 2—rotor, 20—permanent magnet carrier, 21—permanent magnet.

DETAILED DESCRIPTION

The technical scheme in the embodiments of the present disclosure will be clearly and completely described below with reference to the drawings in the embodiments of the present disclosure. The described embodiments are merely part of the embodiments of the present disclosure, rather than all the embodiments. Based on the embodiments in the present disclosure, all other embodiments obtained by those ordinarily skilled in the art without creative labor are within the protection scope of the present disclosure.

In order to make those skilled in the art better understand the solution of the present application, the present application will be further described in detail below with reference to the accompanying drawings and specific embodiments.

Figure 1:
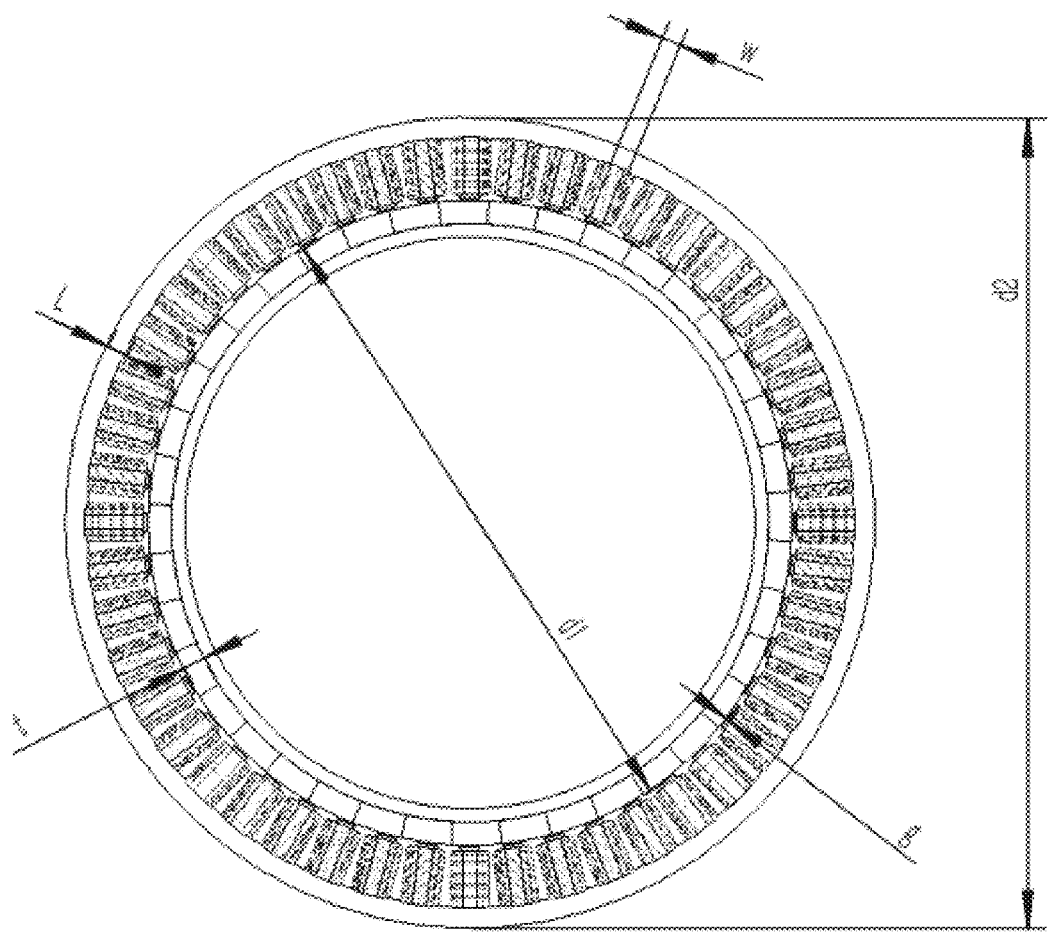
FIG. 1 is a diagrammatic drawing illustrating a permanent magnet brushless motor according to an embodiment of the present disclosure.
Figure 2:
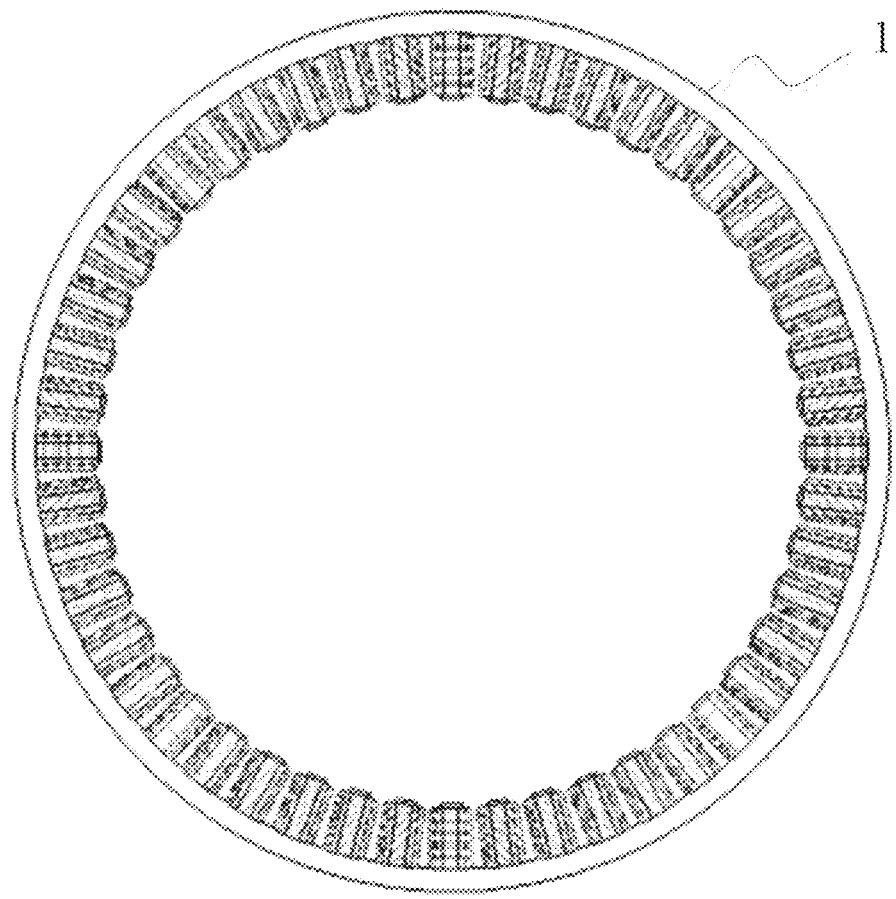
FIG. 2 is a diagrammatic drawing illustrating a stator of a permanent magnet brushless motor according to an embodiment of the present disclosure.
Figure 3:
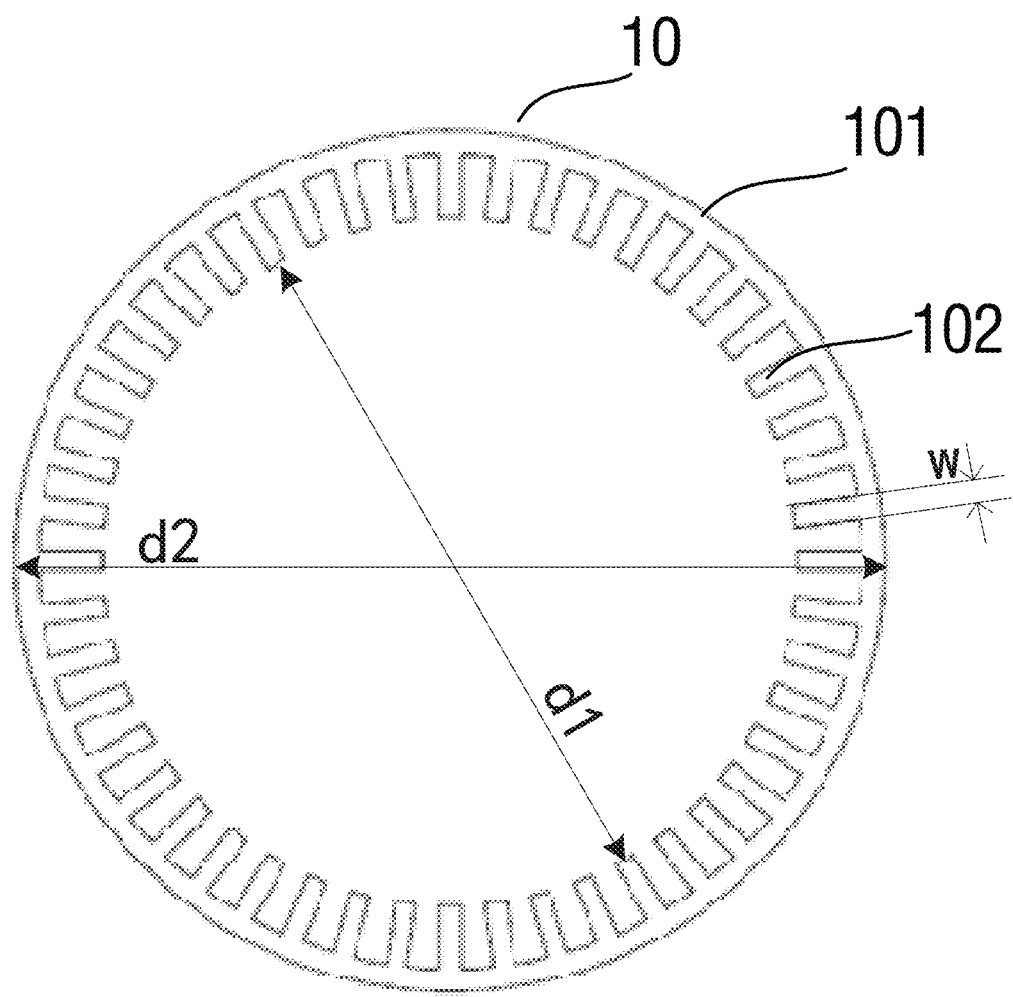
FIG. 3 is a diagrammatic drawing illustrating a stator iron core of a permanent magnet brushless motor according to an embodiment of the present disclosure.
Figure 4:
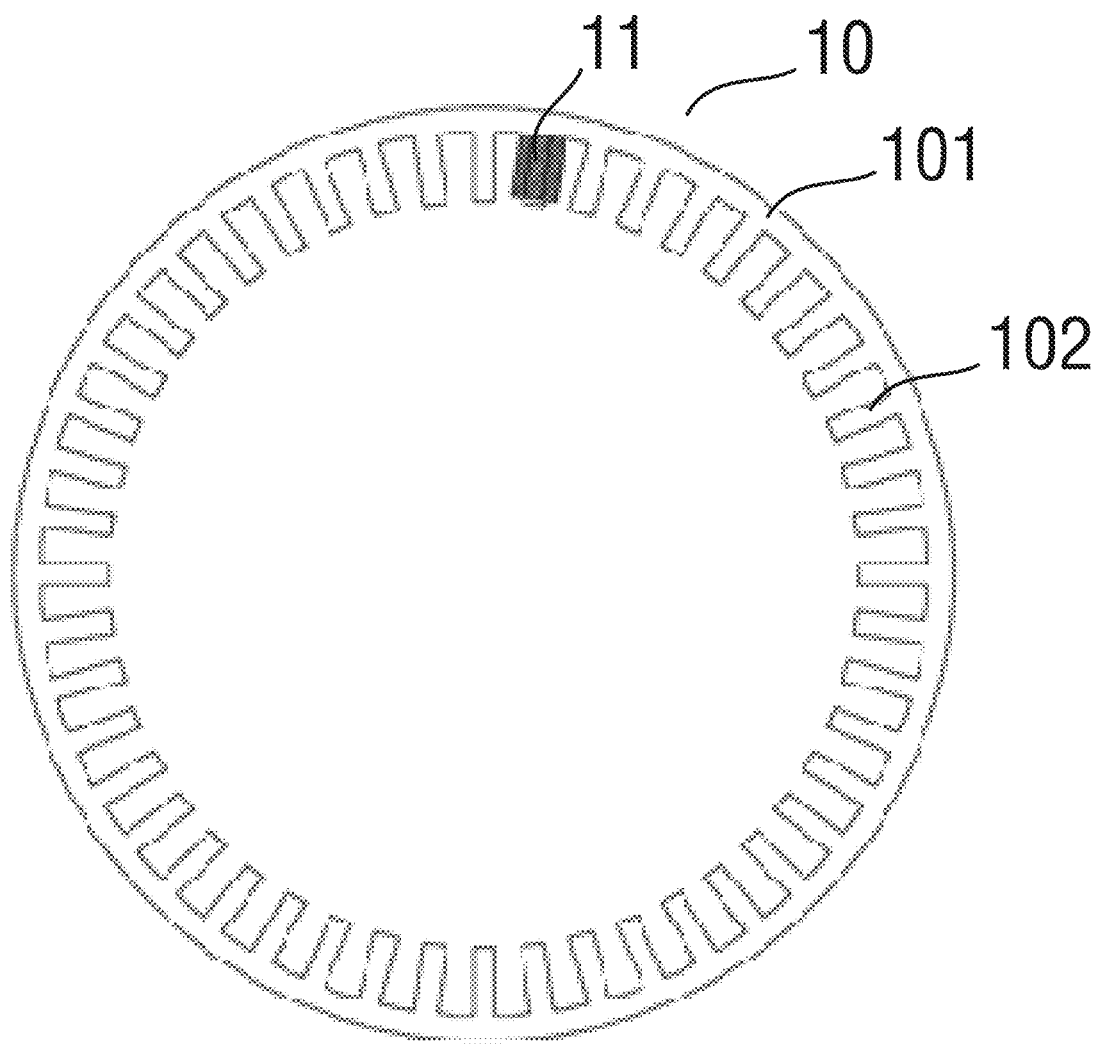
FIG. 4 is a diagrammatic drawing illustrating a stator winding coil installed on a permanent magnet brushless motor according to an embodiment of the present disclosure.
Figure 5:
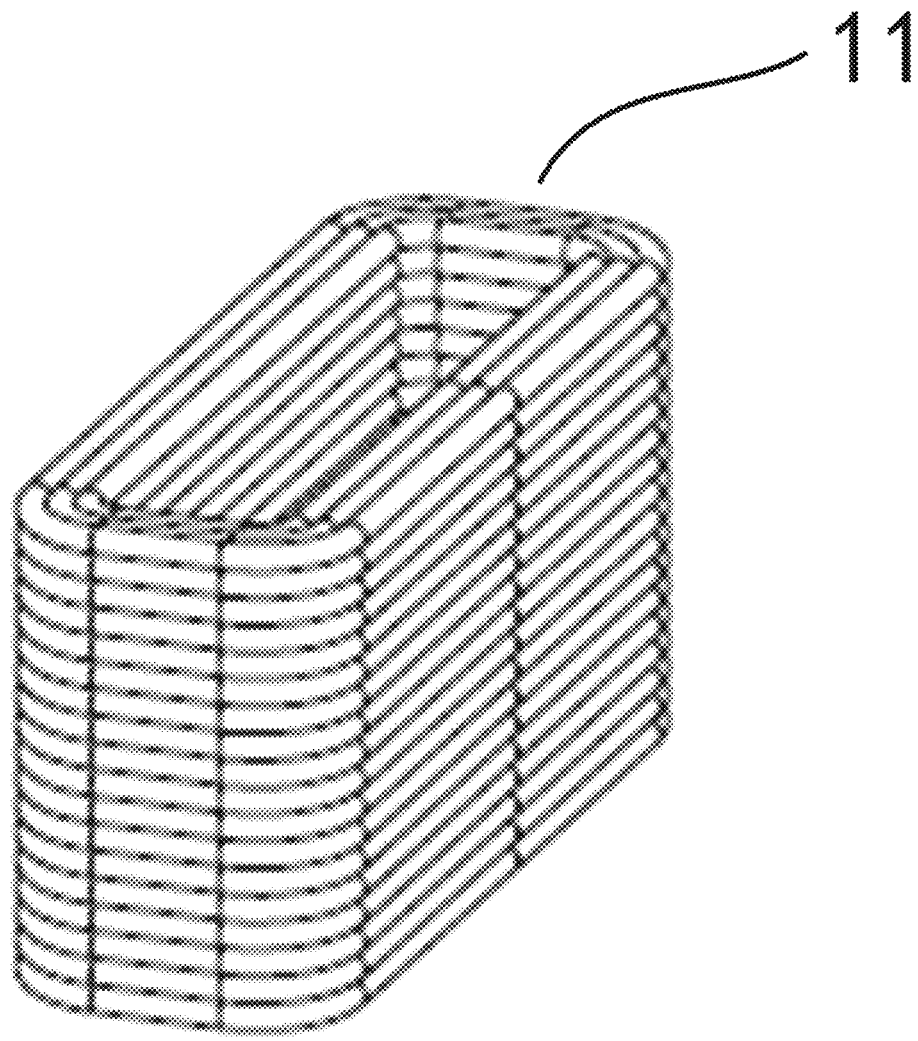
FIG. 5 is a diagrammatic perspective view illustrating a stator winding coil of a permanent magnet brushless motor according to an embodiment of the present disclosure.

As shown in FIG. 1 to FIG. 7, the embodiment of the present disclosure provides a permanent magnet brushless motor, the permanent magnet brushless motor is of fractional-slot and inrunner type. The motor includes a stator 1 and a rotor 2. The stator 1 includes a stator iron core 10 and a stator winding. In the present embodiment, the stator iron core 10 includes a stator yoke 101 and stator teeth. The stator teeth include a plurality of stator teeth 102 protruding from the stator yoke 101. In the present embodiment, the stator iron core 10 has an integral structure. As an example rather than limitation, the stator iron core 10 may be made of stacked laminated silicon steel sheets or stacked soft magnetic material sheets. The stator winding includes a preset count of winding coils 11 wound by machine. The stator winding is a concentrated winding, i.e., pitch of the winding coils is one, and each winding coil 11 is correspondingly having one rather than the plurality of stator teeth 102 inserted into. In the embodiment, the surface of the stator teeth is coated with an insulating layer to ensure insulation between the stator winding and the stator iron core. In the embodiment, each stator tooth is inserted into x winding coils respectively, wherein x is an integer that is greater than or equal to 1. As shown in FIG. 1, each stator tooth is inserted into one winding coil. In other examples below, each stator tooth is inserted into two winding coils. The embodiment does not specifically limit the number of winding coils into which each stator tooth is inserted.

In the embodiment, after being wound by machine, the winding coils maybe assembled onto the stator tooth by insertion of stator tooth. The connection of coils can be finished by welding or soldering to form a stator winding. Otherwise, a plurality of connected winding coils may directly be wound by machine. The embodiment does not specifically limit the method of connection between each winding coil. As an example rather than limitation, in the embodiment, the number of winding coils the stator winding contains may be determined based on the number of the stator teeth and the number of winding coils into which each stator tooth is inserted, e.g., the number of stator teeth of the motor is 48, and when 2 winding coils has one stator tooth inserted into, the stator winding contains 96 winding coils.

In the prior art, the winding coil is directly wound on the stator tooth, therefore, the stator teeth and the winding coils on them may cause certain interference or spatial constraint to the adjacent winding coils in the winding process, so that the gap between adjacent winding coils is often greater than 2-3 mm. In addition, in the prior art, the winding arrangement of the motor for the robot is irregular. These factors seriously affect the slot fill factor of the motor. However, in the embodiment of the present disclosure, there is no interference or spatial constraint during the manufacturing process of winding coils, therefore the design requirement of winding coils is more readily met. The gap between the adjacent winding coils is consequently reduced, thereby significantly increasing the slot fill factor of the motor. In addition, in the present embodiment, the torque density of the motor can be further improved since the conductors in the coil are packed neatly by machine and with such coil motor has a high slot fill factor. Moreover, when a plurality of winding coils is assembled onto each stator tooth, the winding coils close to the stator yoke may be firstly assembled onto each stator tooth, and then the winding coils away from the stator yoke may be assembled onto each stator tooth subsequently. Different from stator with the small number of winding coils on each stator tooth, during installation of winding coils on the stator tooth close to the stator interference with the winding coils already assembled on the adjacent stator teeth can be avoided, thereby improving the slot fill factor and further improving a motor constant and output power density of the motor.

Figure 7:
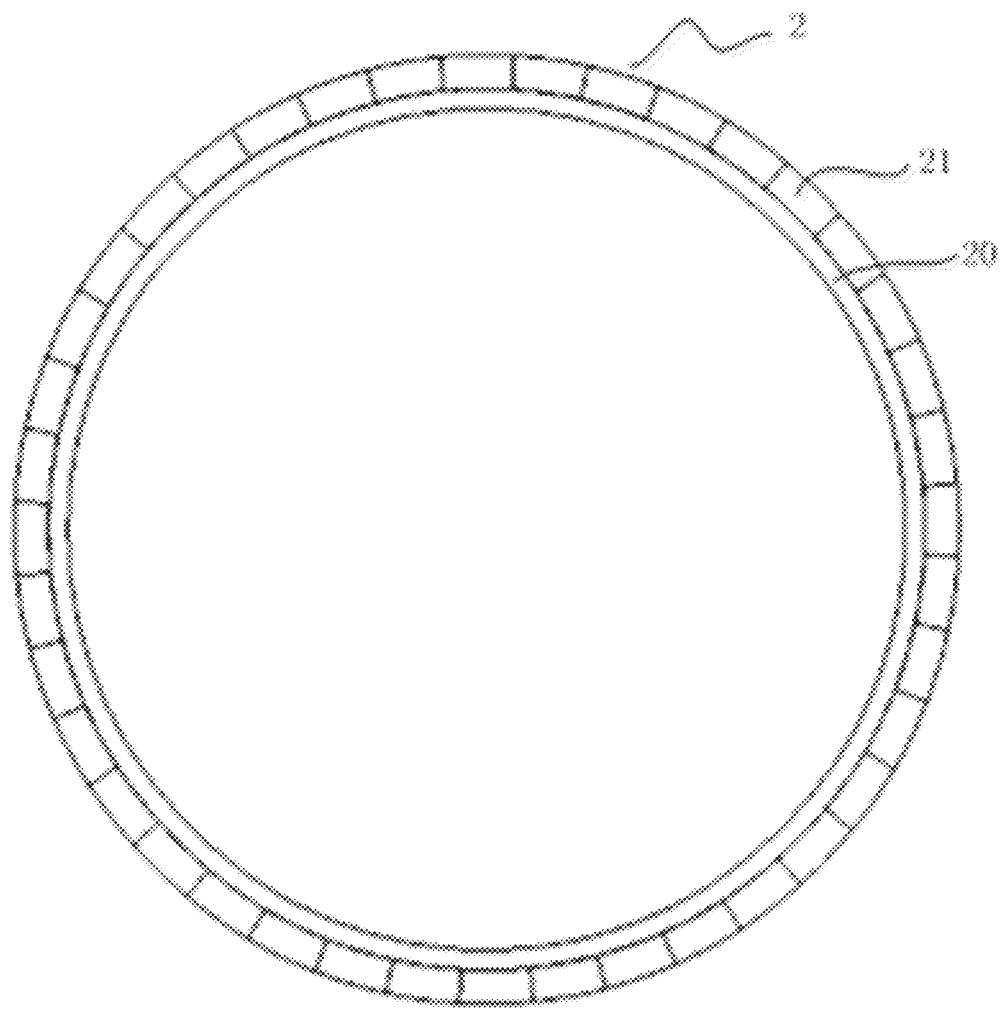
FIG. 7 is a diagrammatic drawing illustrating a rotor of a permanent magnet brushless motor according to an embodiment of the present disclosure.

As shown in FIG. 7, in the present embodiment, the rotor 2 of the permanent magnet brushless motor includes a permanent magnet 21 and a permanent magnet carrier 20, wherein the permanent magnet produces rotating excitation field.

Optionally, in the embodiment, the width of the stator teeth from a tooth top away from the stator yoke 101 to a tooth root close to the stator yoke 101 is equal, which is convenient for the manufacturing of the winding coil 11, and can improve space utilization, thereby improving the per mass motor constant. Understandably, in some examples, the width of each stator tooth from the tooth top away from the stator yoke to the tooth root close to the stator yoke gradually increases. It should be noted that, in the prior art, the stator tooth generally is an inverted T-shaped structure (i.e., each stator tooth has a pole shoe), and the stator tooth with pole shoe may affect the size of a cavity 110 of the winding coils, thereby reducing the space utilization of the winding coils. And in the present embodiment, the elimination of pole shoe of the stator tooth improves the space utilization of the winding coils, thereby further improving the per mass motor constant.

Figure 6:
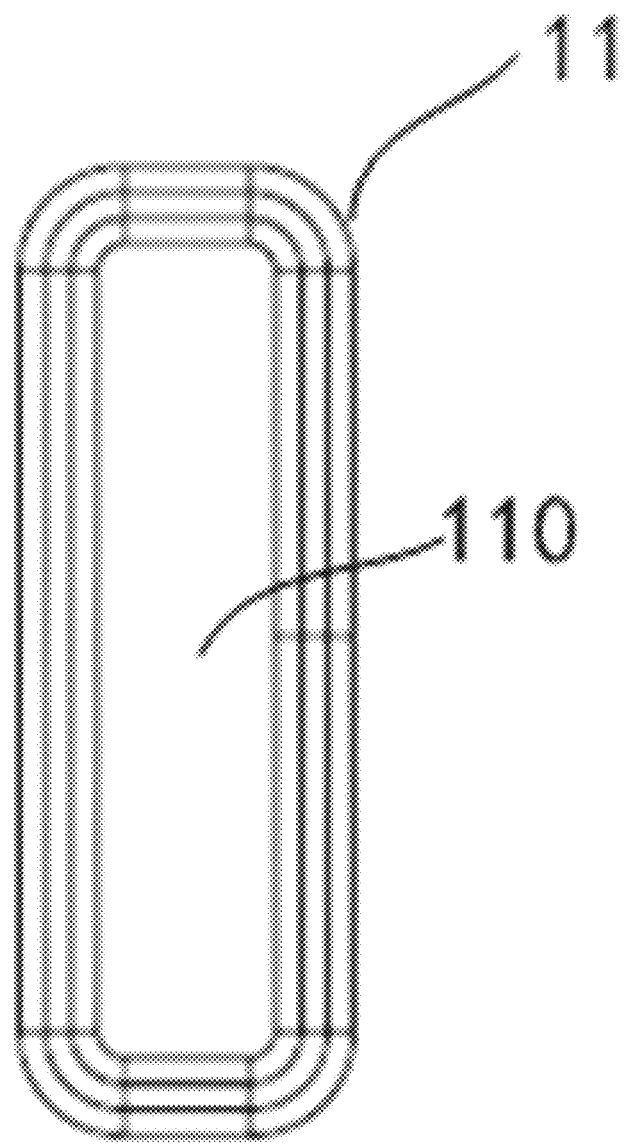
FIG. 6 is a diagrammatic drawing illustrating a stator winding coil of a permanent magnet brushless motor according to an embodiment of the present disclosure.

Optionally, as shown in FIG. 6, in the present embodiment, a cross-sectional shape of the cavity 110 enclosed by each winding coil may be a rounded rectangle shown in FIG. 6. In some applications, the cross-sectional shape of the cavity 110 may interchangeably be a racetrack, an ellipse, a rectangle, or a parallelogram. The cavity 110 may be slightly larger than the stator tooth 102 so that the stator tooth 102 can be conveniently inserted into the winding coil 11. The shape of the racetrack or ellipse and other shapes are convenient for manufacturing of the winding coil 11. The cavity 110 in the shape of the rectangle, rounded rectangle, and parallelogram results in high space utilization and low length of end conductor, which increases the motor's per weight motor constant. It may be understood that due to limitation of manufacturing process and physical property of magnetic wire, the shape of the cavity 110 in an actual product has a slight difference from ideal shape of the racetrack, the ellipse, the rectangle, or the parallelogram.

Optionally, in the present embodiment, a protruded part of each stator tooth 102 in the circumferential direction forms chamfer or fillet at edges, e.g., four edges and vertices of the stator tooth form chamfer or fillet edges, thereby preventing the sharp edges of the stator tooth 102 from damaging the insulation layer on the surface of the winding coil when the winding coil is being installed. In some applications, the part connecting the stator tooth 102 and the stator yoke 101 may form chamfer or fillet edges.

In the present embodiment, to further improve firmness of a combination between the winding coil 11 and the stator tooth 102, the stator 1 may include an adhesive layer, the winding coil 11 is bonded onto the stator tooth 102 through the adhesive layer. The adhesive layer may be formed after cure of adhesive glue, which has uniformly coated the surface of the stator tooth 102 or the inner side of the winding coil 11. Specifically, part or all of the surface of the stator tooth 102 may be uniformly coated by the adhesive glue, then the stator tooth 102 is inserted into the winding coil 11, and the glue is cured to form an adhesive layer so that the winding coil 11 and the stator tooth 102 are bonded together and difficult to fall apart.

Based on the above embodiments, the present embodiment makes a further change to the size and structure of the motor, the details are as following.

Figure 8:
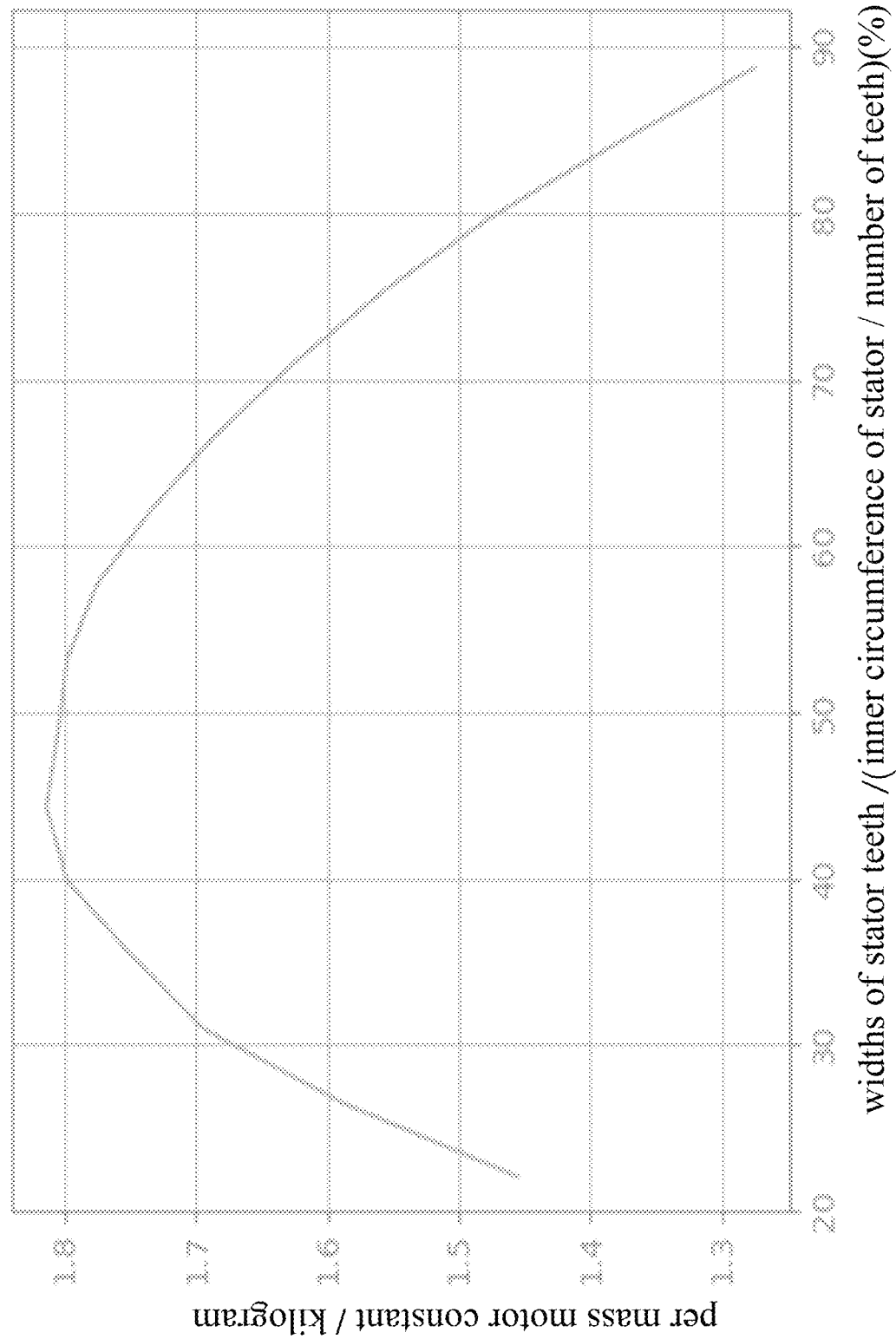
FIG. 8 to FIG. 13 are charts illustrating simulated torque performance of a permanent magnet brushless motor according to an embodiment of the present disclosure.
Figure 9:
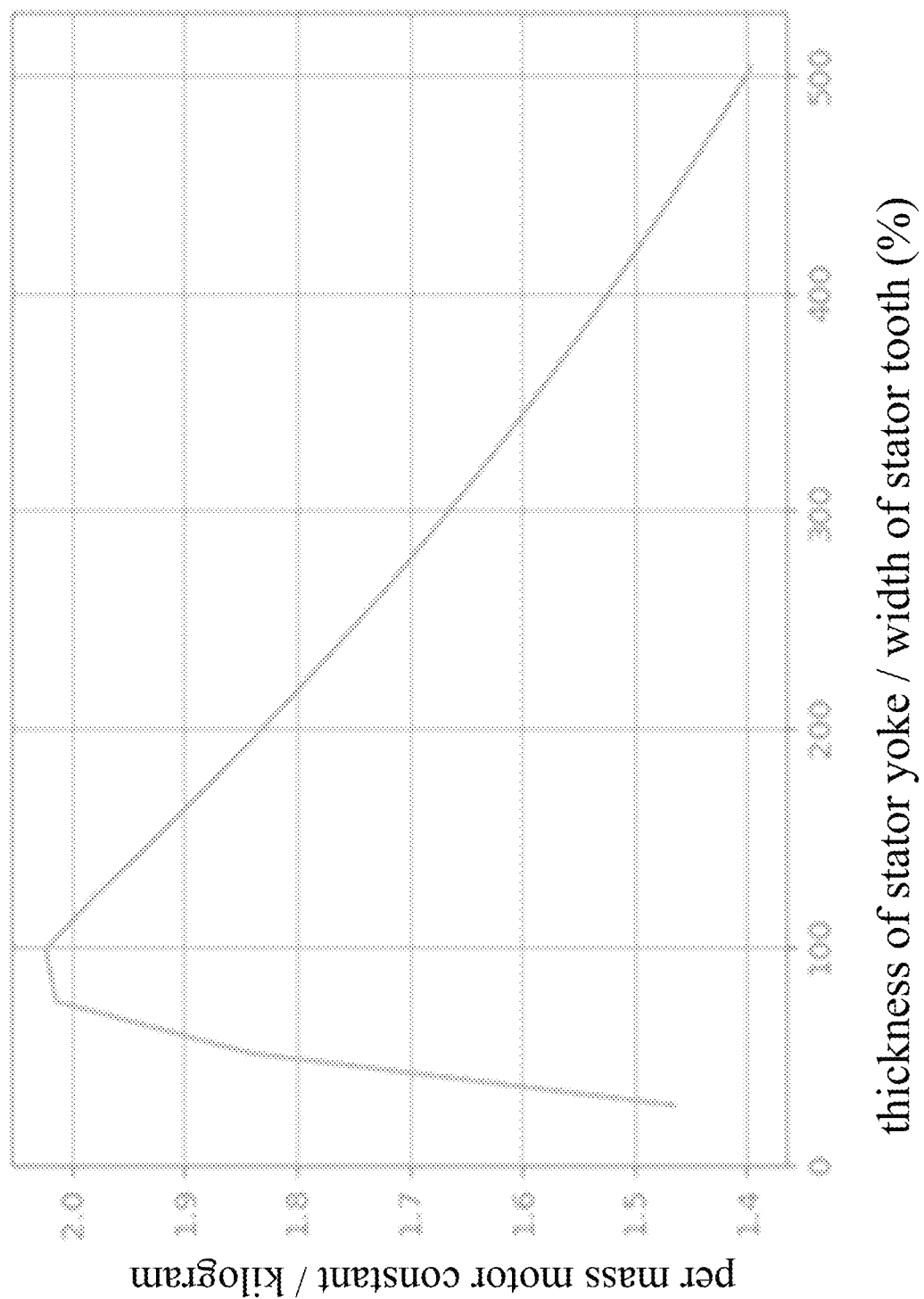
Figure 10:
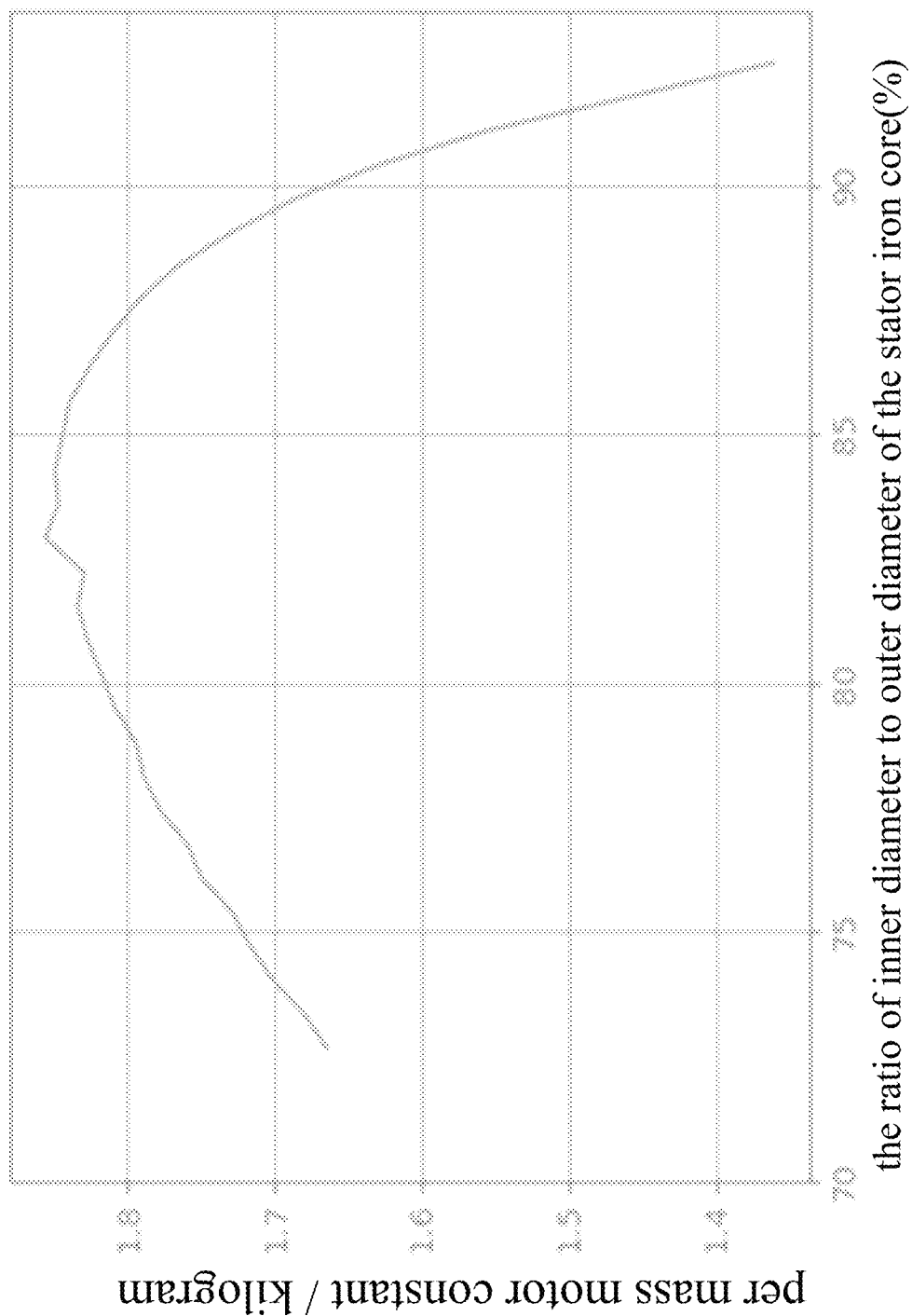
Figure 11:
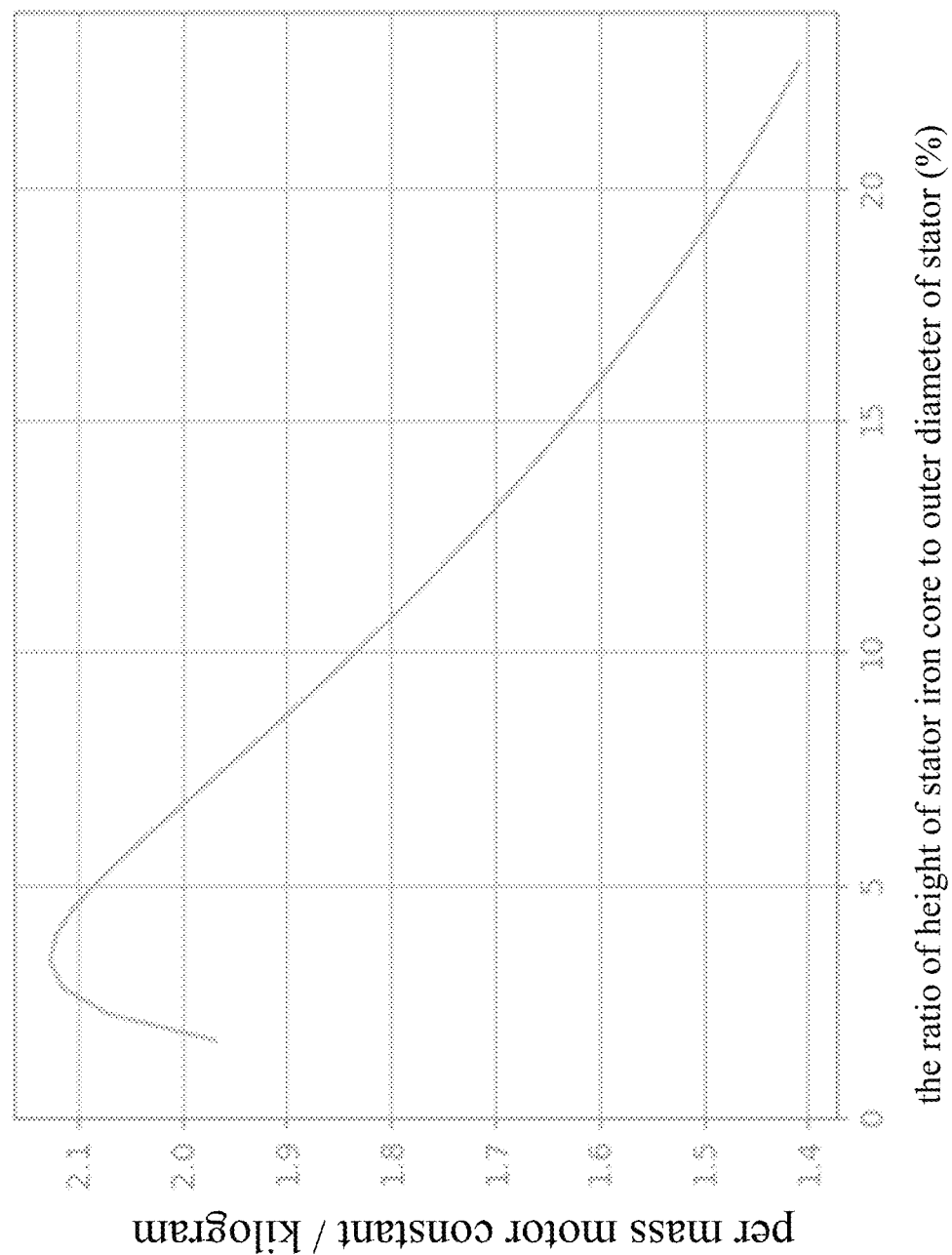
Figure 12:
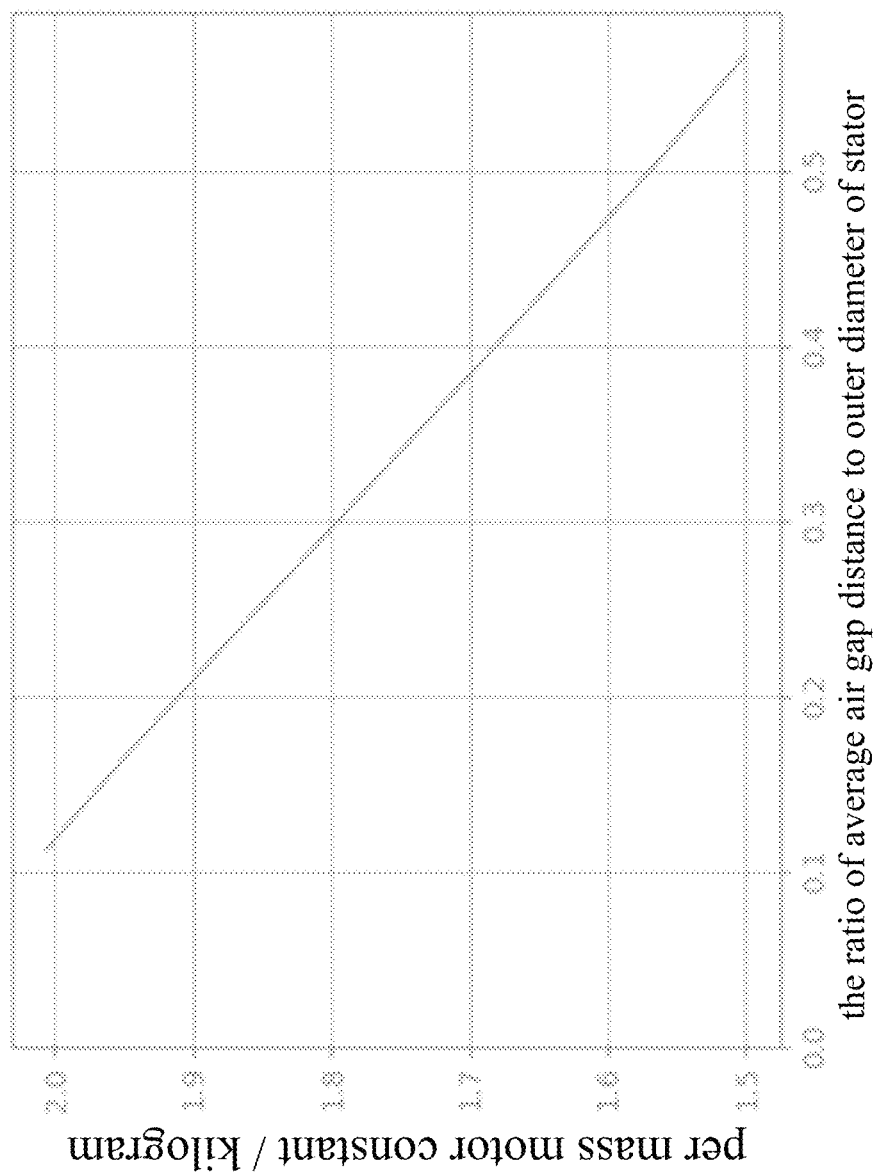
Figure 13:
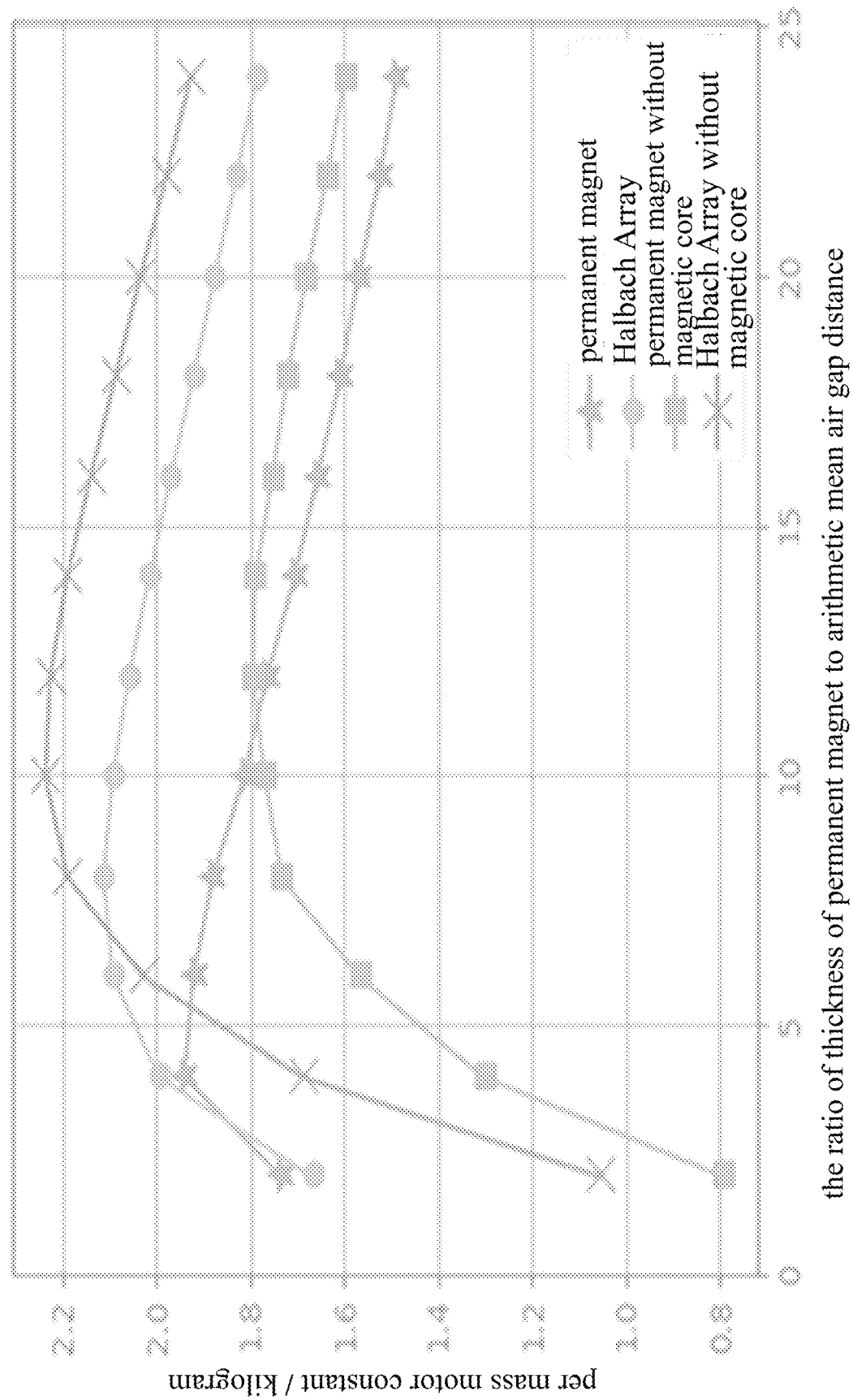
Figure 14A:
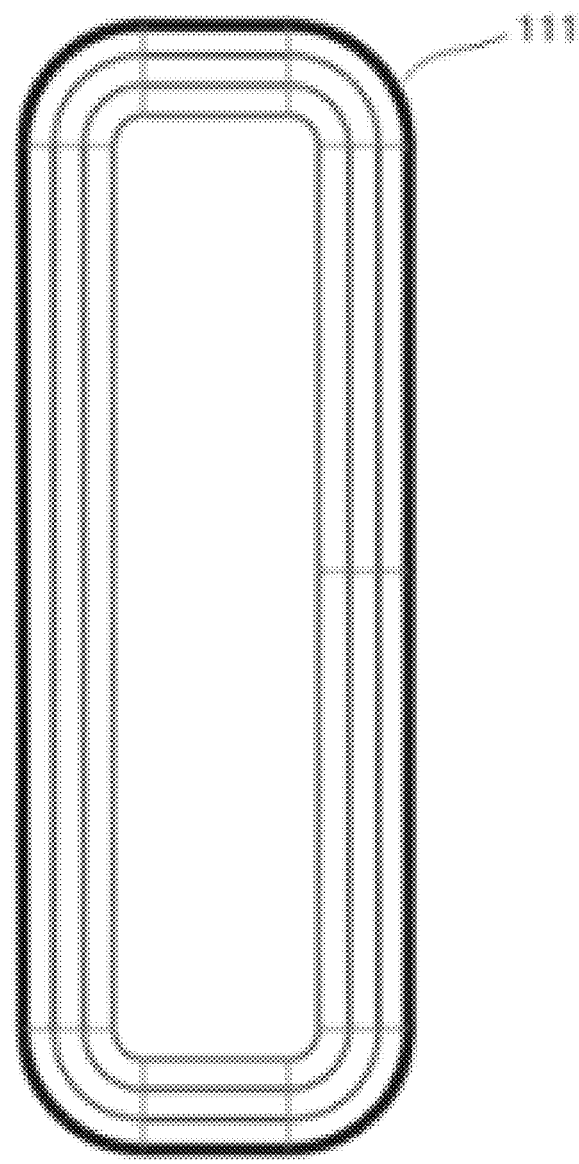
FIG. 14a and FIG. 14b are diagrammatic drawings illustrating a circumference of a stator winding coil of a permanent magnet brushless motor according to an embodiment of the present disclosure.
Figure 14B:
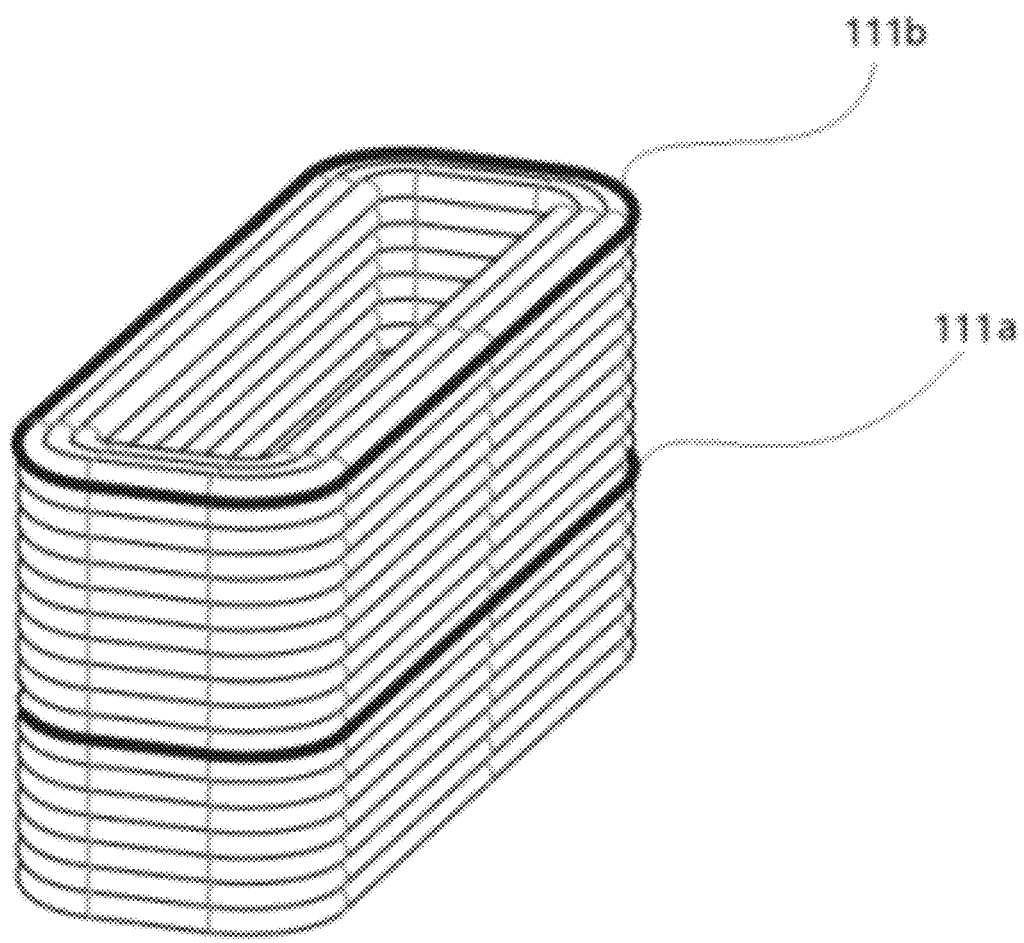

In the present embodiment, the width w of the narrowest part of each stator tooth is greater than or equal to 30% of an inner circumference of the stator/N and is less than or equal to 65% of the inner circumference of the stator/N, wherein N is the number of the stator teeth 102, and the diameter of stator inner circle is stator inner diameter $d_1$. In the present embodiment, N=48. As shown in FIG. 8, FIG. 8 is the chart illustrating simulated effect of the width of stator/(the inner circumference of stator/the number of teeth) on per mass motor constant. The thickness L of the stator yoke is greater than or equal to 30% of the width w of the narrowest part of the stator tooth and is less than or equal to 250% of the width w of the narrowest part of the stator tooth. As shown in FIG. 9, FIG. 9 is the chart illustrating simulated result of ratio of the thickness of the stator yoke/the width of the stator tooth and the per mass motor constant. The inner diameter $d_1$ of the stator iron core is greater than or equal to 75% of the outer diameter $d_2$ of the stator iron core and is less than or equal to 90% of the outer diameter $d_2$ of the stator iron core. As shown in FIG. 10, FIG. 10 is the chart illustrating simulated effect of ratio of the inner diameter to outer diameter of the stator iron core on per mass motor constant. The axial height of the stator iron core is less than or equal to 20% of a stator outer diameter $d_2$. As shown in FIG. 11, FIG. 11 is the chart illustrating simulated effect of a ratio of height of the stator iron core/outer diameter of the stator on per mass motor constant. Air gap distance g is formed between the stator 1 and the rotor 2, and the arithmetic mean air gap distance g of the motor is less than or equal to 0.7% of the outer diameter of the stator. As shown in FIG. 12, FIG. 12 is the chart illustrating simulated effect of ratio of arithmetic mean air gap distance to the outer diameter of the stator on per mass motor constant. The arithmetic mean radial thickness t of the permanent magnet is less than or equal to 25 times the arithmetic mean air gap distance g and is greater than or equal to 2 times the arithmetic mean air gap distance. As shown in FIG. 13, FIG. 13 is the chart illustrating simulated effect of ratio of the arithmetic mean radial thickness of the permanent magnet to the arithmetic mean air gap distance on per mass motor constant.

It should be noted that further optimization of the above structures and sizes in the present embodiment is proposed by the inventor based on the difficulty of implementation and comprehensive consideration of factors such as electromagnetic performance of the motor. Thanks to optimization of the size and topology of the motor, the present embodiment is less challenging to manufacture, process, and assemble, which is conducive to improving the slot fill factor, increasing air gap area, increasing electromagnetic performance, thereby improving per mass motor constant of the permanent magnet brushless motor.

As shown in FIG. 7, in the present embodiment, the permanent magnet 21 is mounted on a side surface of the permanent magnet carrier 20. The side surface is the on the side closer to the stator. The permanent magnet 21 may be made of neodymium magnet.

Optionally, in the present embodiment, the permanent magnet 21 includes a plurality of permanent magnet pieces, each permanent magnet piece is mounted on a surface of the permanent magnet carrier, i.e., the permanent magnet is surface mount permanent magnet.

Optionally, the permanent magnet 21 may be of integral annulus structure, and the permanent magnet 21 is mounted on the surface of the permanent magnet 20. The permanent magnet 21 may be fixed on the permanent magnet carrier 20 by adhesive.

Optionally, in the present embodiment, the permanent magnet carrier 20 is a rotor iron core made of soft magnetic material. For another example of implementation, the material of the permanent magnet carrier 20 may be non-soft material. As an example rather than limitation, the material of the permanent magnet carrier 20 may be aluminum alloy. Compared to the rotor iron core made of non-soft magnetic material, weight of the permanent magnet carrier 20 made of aluminum alloy is significantly reduced so that per mass motor constant of the motor increases.

Optionally, in the present embodiment, a plurality of permanent magnet pieces may form a Halbach Array.

Compared to the permanent magnet buried in the permanent magnet carrier, the permanent magnet 21 installed on the surface of the permanent magnet carrier 20 in the present embodiment not only makes the manufacturing process simpler and the weight of the motor smaller but also reduces the induction impact of winding current on the rotating excitation field, thus improving the inductive linearity of the motor and making the motor easier to control and run more smoothly. Reluctance torque of the permanent magnet brushless motor in the present embodiment is less than or equal to the greater of 10% of rated torque and 5% of peak torque, thereby ensuring stability of the motor operation.

In the embodiment, the motor may be a three-phase motor, a slot pole number of the motor is an integer multiple of 12/10 or 12/14. The number of magnetic poles of a permanent magnet 21 may be 40, the teeth-to-pole ratio of the motor can effectively reduce cogging torque, thereby causing a smooth operation of the motor.

As shown in FIG. 1, FIG. 5, FIG. 14a and FIG. 14b, in the embodiment, circumference 111 of the winding coil on the stator tooth from close to the stator yoke to away from the stator yoke tends to decrease. As an example, the circumference 111a of the winding coil close to the tooth root is greater than or equal to the circumference 111b of the winding coil close to the tooth top, thereby improving the slot fill factor and simplifying the process of inserting tooth into a coil.

Figure 15:
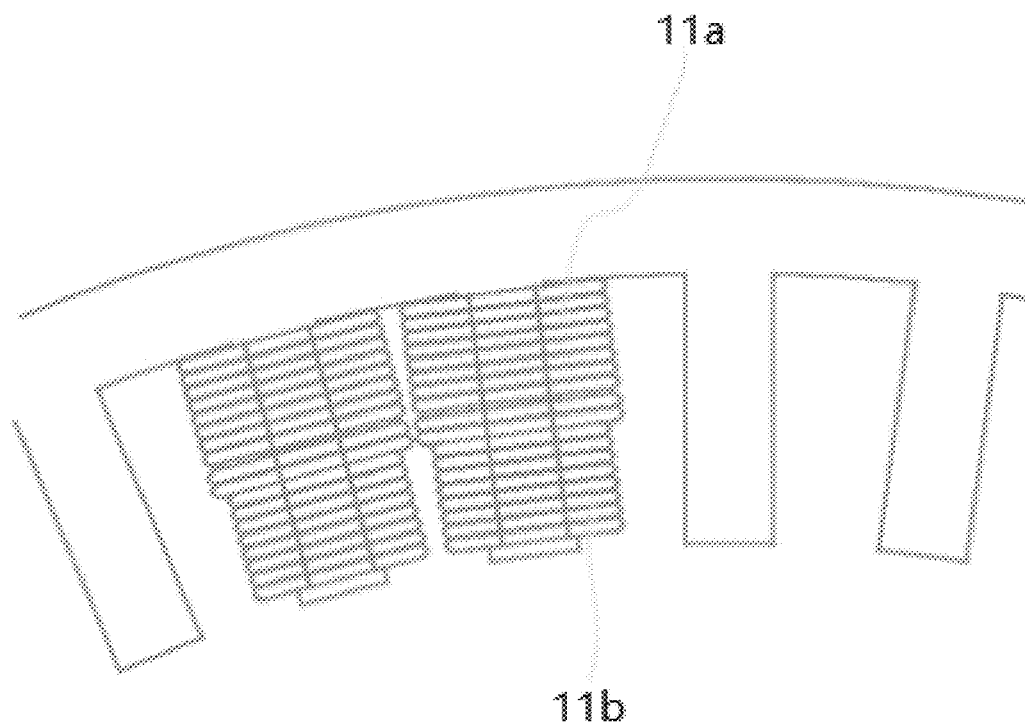
FIG. 15 is a diagrammatic drawing illustrating a winding coil installed on a permanent magnet brushless motor according to another embodiment of the present disclosure.
Figure 16:
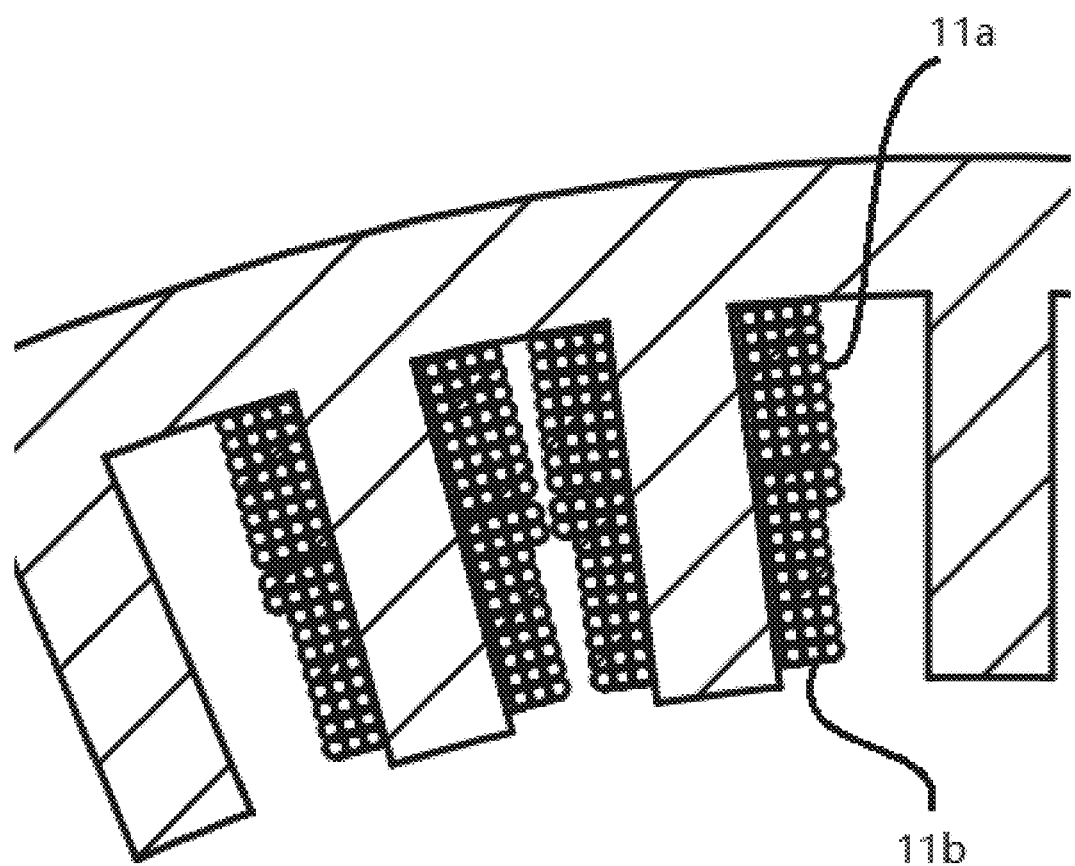
FIG. 16 is a diagrammatic cross section illustrating a winding coil arrangement of a permanent magnet brushless motor according to another embodiment of the present disclosure.

As shown in FIG. 15, in another embodiment, one stator tooth is inserted into two winding coils, i.e., x=2, two winding coils are respectively the tooth root winding coil 11a and the tooth top winding coil 11b. As shown in FIG. 16, as an example rather than limitation, the number of turns of the two winding coils can be the same, and the tooth root winding coil 11a and the tooth top winding coil 11b on the same stator tooth can be connected in parallel to reduce the resistance of the stator winding, thereby improving peak velocity of the motor without adding operating voltage, and further improving output power density. By inserting one stator tooth into two or more winding coils 11, the slot fill factor can be improved when the winding coils on the adjacent stator teeth have the same shape.

The per mass motor constant of the embodiment of the present disclosure may reach 2.0 Nm/kg, which is significantly larger than the prior art. Under the condition that the motors are of similar or equal weight, the operating voltage is the same, and the heat dissipation is good, the output power density of the permanent magnet brushless motor in this embodiment may reach 12 kw/kg.

According to an embodiment of the present disclosure, a robot joint actuator is further provided, including the above permanent magnet brushless motor.

According to an embodiment of the present disclosure, a servo actuator is further provided, including the above permanent magnet brushless motor.

According to an embodiment of the present disclosure, a robot is further provided, including the above actuator.

It may be understood for those of ordinary skill in the art that the above each embodiment is a specific embodiment for realizing the present disclosure, and in practical applications, various changes in form and details may be made without departing from the spirit and scope of the present disclosure.

What is claimed is:

1. A motor, comprising a stator and a rotor; wherein the stator comprises a stator iron core and a stator winding;
   an axial height of the stator iron core is less than or equal to 20% of an outer diameter of the stator;
   the stator iron core comprises an annular stator yoke and stator teeth protruding from an inner side of the annular stator yoke;
   the stator teeth comprise a plurality of stator teeth, a width of each of which from tooth top away from the stator yoke to a tooth root close to the stator yoke is the same or gradually increases;
   the stator winding comprises a plurality of winding coils, and each stator tooth is inserted into one or more of the plurality of winding coils; and
   the plurality of winding coils are configured to generate a magnetic field after being electrified.

2. The motor of claim 1, wherein a cross-sectional shape of a cavity enclosed by the winding coils is a rounded rectangle, a racetrack, an ellipse, a rectangle or a parallelogram.

3. The motor of claim 1, wherein a protruded part of each stator tooth in a circumferential direction forms chamfer or fillet edges, and a surface of the stator tooth is provided with an insulating layer.

4. The motor of claim 3, wherein a part connecting the stator tooth and the stator yoke forms chamfer or fillet edges.

5. The motor of claim 1, wherein a width of a narrowest part of each stator tooth is greater than or equal to 30% of a ratio of an inner circumference of the stator to N, and is less than or equal to 65% of the ratio of the inner circumference of the stator to N, wherein N is the number of the stator teeth;

a thickness of the stator yoke is greater than or equal to 30% of the width of the narrowest part of the stator tooth, and is less than or equal to 250% of the width of the narrowest part of the stator tooth; and an inner diameter of the stator iron core is greater than or equal to 75% of an outer diameter of the stator iron core, and is less than or equal to 90% of the outer diameter of the stator iron core.

6. The motor of claim 1, wherein an air gap is formed between the stator and the rotor, and an arithmetic mean air gap distance is less than or equal to 0.7% of the outer diameter of the stator.

7. The motor of claim 6, wherein an arithmetic mean radial thickness of the permanent magnet is less than or equal to 25 times the arithmetic mean air gap distance and is greater than or equal to 2 times the arithmetic mean air gap distance.

8. The motor of claim 1, wherein the rotor comprises a permanent magnet and a permanent magnet carrier, the permanent magnet is mounted on a side surface of the permanent magnet carrier, in which the side surface is on a side closer to the stator, and the permanent magnet produces rotating excitation field.

9. The motor of claim 8, wherein the permanent magnet includes a plurality of permanent magnet pieces, each of which is adhered to a surface of the permanent magnet carrier; or, the permanent magnet is in an integral annular structure and is mounted on the surface of the permanent magnet carrier.

10. The motor of claim 9, wherein the plurality of permanent magnet pieces form a Halbach array.

11. The motor of claim 8, wherein the material of the permanent magnet carrier is soft magnetic material or non-soft magnetic material.

12. The motor of claim 1, wherein the motor is a three-phase motor, the slot and pole number of the motor is an integer multiple of 12/10 or 12/14.

13. A robot joint actuator, comprising the motor of claim 1.

14. A robot, comprising the robot joint actuator of claim 13.

15. A servo actuator, comprising the motor of claim 1.

16. The motor of claim 1, wherein at least one of the stator teeth is inserted into two or more winding coils, and the winding coils close to the stator yoke are firstly assembled onto the stator tooth, the winding coils away from the stator yoke are assembled onto the stator tooth subsequently.

17. The motor of claim 1, wherein a first circumference of at least one of the winding coils is smaller than or equal to a second circumference of the at least one of the winding coils, the first circumference being further away from the stator part than the second circumference.

18. The motor of claim 1, wherein the motor is of fractional-slot and inrunner type.

19. A motor, comprising a stator and a rotor, wherein the stator comprises a stator iron core and a stator winding;

the stator iron core comprises an annular stator yoke and stator teeth protruding from an inner side of the annular stator yoke, the stator teeth comprise a plurality of stator teeth, a width of each of which from tooth top away from the stator yoke to a tooth root close to the stator yoke is the same or gradually increases;

the stator winding comprises a plurality of winding coils, wherein each stator tooth is inserted into one or more of the plurality of winding coils;

a width of a narrowest part of each stator tooth is greater than or equal to 30% of a ratio of an inner circumference of the stator to N, and is less than or equal to 65% of the ratio of the inner circumference of the stator to N, wherein N is the number of the stator teeth;

a thickness of the stator yoke is greater than or equal to 30% of the width of the narrowest part of the stator tooth, and is less than or equal to 250% of the width of the narrowest part of the stator tooth; and an inner diameter of the stator iron core is greater than or equal to 75% of an outer diameter of the stator iron core, and is less than or equal to 90% of the outer diameter of the stator iron core; and the plurality of winding coils are configured to generate a magnetic field after being electrified.

20. A motor, comprising a stator and a rotor; wherein the stator comprises a stator iron core and a stator winding;

the stator iron core comprises an annular stator yoke and stator teeth protruding from an inner side of the annular stator yoke, the stator teeth comprise a plurality of stator teeth, a width of each of which from tooth top away from the stator yoke to a tooth root close to the stator yoke is the same or gradually increases;

the stator winding comprises a plurality of winding coils, and each stator tooth is inserted into one or more of the plurality of winding coils; and the plurality of winding coils are configured to generate a magnetic field after being electrified;

an air gap is formed between the stator and the rotor, and an arithmetic mean air gap distance is less than or equal to 0.7% of an outer diameter of the stator.

* * * * *